UNITED STATES PATENT OFFICE.

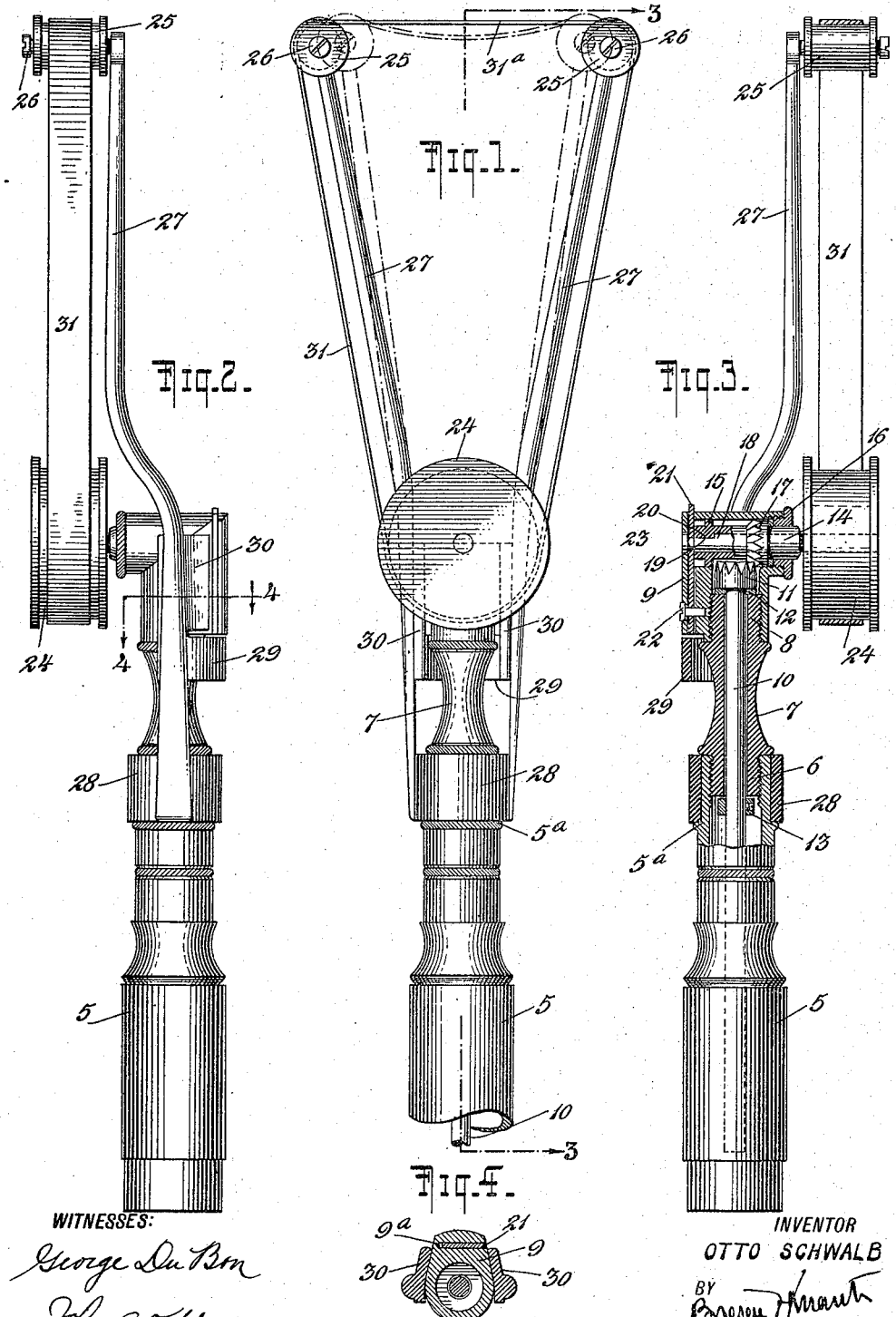

OTTO SCHWALB, OF JERSEY CITY, NEW JERSEY, ASSIGNOR TO ROBERT H. LIEBERTHAL, OF NEW YORK, N. Y.

DENTAL TOOL.

1,227,207.   Specification of Letters Patent.   Patented May 22, 1917.

Application filed July 22, 1915. Serial No. 41,320.

*To all whom it may concern:*

Be it known that I, OTTO SCHWALB, a citizen of the United States, and resident of Jersey City, county of Hudson, and State of New Jersey, have invented certain new and useful Improvements in Dental Tools, of which the following is a specification.

My improvement relates to tools and has for its object to provide a simple and highly efficient implement adapted to be used for polishing, cutting and other purposes in connection with various arts. My invention will be fully described hereinafter and the features of novelty will be pointed out in the appended claims.

In the accompanying drawings, which illustrate an example of my invention, Figure 1 is an elevation of my improved tool; Fig. 2 is an edge view thereof; Fig. 3 is a vertical section on the line 3—3 of Fig. 1 and Fig. 4 is a horizontal section on the line 4—4 of Fig. 2.

As shown in the drawings the tool comprises a main tubular section 5, internally screw-threaded at its upper end to receive the neck 6 of a sleeve or the like 7, the latter in turn having a second screw-threaded neck 8 upon which the casing 9 is arranged to be detachably secured. A shaft 10 rotatably fits the sleeve 7 and extends through the same in opposite directions and has its lower end located in the main section 5. The upper end of said shaft 10 carries a pinion 11 located within the casing 9 and rotatable upon a washer 12 therein, which washer engages the end of the neck 8 and prevents the shaft 10 from moving lengthwise of the sleeve 7 in one direction. Any suitable means may be provided for preventing an axial movement of the shaft in the opposite direction as for instance a collar 13 secured upon said shaft 10 and arranged to engage the end of the neck 6. A sleeve or tubular member 14 extends transversely across the casing 9 and is provided near its one end with an annular flange 15 adapted to rotatably fit within said casing 9 and has its opposite end journaled in a cap 16 detachably secured in said casing in any suitable manner as by screw-threading. The said sleeve 14 which preferably projects outwardly beyond the cap 16 thus has its axis at right angles to the axis of the shaft 10 and carries a pinion 17 in mesh with the pinion 11 as shown in Fig. 3. A counter shaft 18 extends into the sleeve 14 and in the illustrated example is provided with a recessed portion 19 in engagement with an inwardly extending projection 20 on the sleeve 14 whereby said counter shaft and sleeve are connected to rotate in unison. It will of course be understood that the illustrated means for connecting the counter shaft 18 and sleeve 14 together is only an example and that other equivalent arrangements may be substituted. In order that a movement of the counter shaft 18 lengthwise of the sleeve 14 may be prevented, I have provided a locking lever 21 pivoted at 22 in a vertical slot 9ª formed in the casing 9, the said lever 21 in its operative position being arranged to extend into an annular groove 23 located on the counter shaft 18. It will be obvious that the counter shaft 18 may be held against axial movement in the sleeve 14 in any other way if desired, the illustrated arrangement representing a simple example which permits a free rotation of said counter shaft and yet prevents an axial movement thereof relatively to the sleeve 14. At its outer end the counter shaft 18 carries a pulley 24, located centrally beneath and at a distance from auxiliary pulleys 25 which are rotatably mounted on axles 26 projecting from arms 27 preferably having a resilient tendency to spread apart. The arms 27 are carried by a collar 28 surrounding the upper end of the main section 5 and clamped between a bead 5ª thereof and the sleeve 7 as shown in Fig. 3. In order to prevent rotation of the collar 28 about its axis the arms 27 carry a yoke 29 having members 30 adapted to engage the opposite sides of the casing 9 which are substantially flat and preferably converge toward the locking lever 21 as illustrated in Fig. 4.

An endless element or band 31 is arranged to travel over the pulleys 24 and 25 and to receive motion from the pulley 24, the operative portion 31ª of said element normally extending in a substantially straight line between the two pulleys 25 as shown by solid lines in Fig. 1. This element or band 31 may be an endless belt having an abrasive or other cutting surface, or it may be an endless belt provided with a polishing surface or it may be an endless flexible band saw or any other device, this depending on the use to which the tool is to be put. The main section 5 may be operatively combined with any mechanism as for instance an ordinary dental engine having a driving shaft adapted for connection with the shaft 10 and whereby the latter is driven. As this shaft 10 is driven it will rotate the pinion 11 which in turn will rotate the pinion 17 whereby the sleeve 14 and consequently the counter shaft 18 and pulley 24 will be similarly actuated. The rotation of the pulley 24 will impart a linear movement to the element 31 and cause it to travel over and between the pulleys 25, the element 31 being maintained under tension and in proper frictional engagement with the pulley 24 by the resiliency of the arms 27 and their tendency to spread apart. By utilizing the section 5 or any continuation thereof as a handle the portion 31a of the element or band 31 may be readily and conveniently manipulated in connection with the element under treatment. For instance if the band 31 is provided with an abrasive or a polishing surface the same may be utilized as a dental tool for cleaning and polishing teeth, the arrangement making it possible to easily reach each and every tooth including the back teeth. The portion 31a of the band 31 is further capable of being caused to travel between adjacent teeth and thus used to space same or to cut away portions of said teeth to form the required space therebetween. In either case owing to the perfect control of the tool the danger of unintentionally destroying tissue is reduced to a minimum and much more effective and uniform results are attained than heretofore because of the fact that the band 31 travels continuously in one direction when in operation. The band 31 being flexible the portion 31a will readily accommodate itself to convex and other surfaces as shown for instance by dotted lines in Fig. 1, the arms 21 yielding inwardly and at all times maintaining said band 31 under the required tension.

It will readily be apparent that the tool may be utilized for polishing parts of machinery or other elements and owing to the arrangement of the portion 31a of the band 31 is particularly adapted for reaching parts which are ordinarily not readily accessible, thus ofttimes making it unnecessary to dismantle a mechanism in order to polish a certain part thereof. If the band 31 comprises an endless saw the section may be combined with a suitable handle and suitable operating mechanism and then used for sawing off limbs from trees and the like and for other pruning purposes. In this case it is unnecessary in most instances for the operator to climb the tree or use a ladder as the handle may be made long enough to bring the portion 31a to a considerable height. During the sawing off a limb of a tree, the ends of the arms 27 may rest against the same to properly support the portion 31a during the sawing operation.

The tool is thus capable of being easily manipulated under all conditions. It will be evident that my improved implement is capable of use in many other ways and that the above are only examples of its utility. The parts of the tool are capable of being readily disconnected when for any reason this becomes necessary and are also easily assembled so that the tool may be kept in a condition of maximum efficiency at all times with a minimum of effort. The pulleys and endless band and their supports may if desired be arranged as an attachment capable of being temporarily combined with any standard instrument as for instance a dental engine or the like.

Various changes in the specific form shown and described may be made within the scope of the claims without departing from the spirit of my invention.

I claim:

1. The combination of a handle having a flattened surface, a collar rotatably carried by said handle, members secured to said collar and extending beyond said handle, a flattened surface on one of said members adapted to coöperate with the flattened surface of said handle to prevent a rotation of said collar whereby said members are maintained in a predetermined position, pulleys on said members, a driving pulley on said handle, an endless band passing over said pulleys and means for operating said driving pulley whereby said band is actuated.

2. The combination of a handle having a pair of flattened surfaces converging outwardly, a collar rotatably carried by said handle below said surfaces, arms secured to said collar and extending beyond said handle, a yoke connecting said arms at an intermediate point and adapted to engage said converging surfaces to prevent a rotation of said collar, an endless band carried by said arms and means for actuating said band relatively to said arms.

3. The combination of a handle, a collar detachably and rotatably secured thereon, members carried by said collar and extending beyond said handle, means connected with said members and engaging coöperating portions of said handle to prevent a rotation of said collar about its axis, a driving pulley carried by said handle, pulleys located at the free ends of said members, an endless band passing over said pulleys, and means for operating said driving pulley whereby said band is actuated.

4. The combination of a tubular handle, a sleeve connected therewith, a casing detachably connected with said sleeve, a driving shaft extending through said sleeve into said handle, a pinion in said casing connected with said shaft, a tubular member rotatably mounted in said casing and having its axis at an angle to the axis of said driving shaft, a pinion on said tubular member in mesh with the pinion on said driving shaft, a counter shaft in said tubular member, means for connecting said member and counter-shaft together to rotate in unison, releasable means for preventing a lengthwise movement of said counter-shaft in said tubular member, a driving pulley carried by said counter-shaft, normally diverging flexible arms extending beyond an end of said handle and in line with said driving pulley, a pulley located at the free end of each arm and an endless band passing over said pulley and maintained under tension by said arms.

In testimony whereof I have hereunto set my hand.

OTTO SCHWALB, D. D. S.

Copies of this patent may be obtained for five cents each, by addressing the "Commissioner of Patents, Washington, D. C."